United States Patent
Xu et al.

(10) Patent No.: US 12,024,612 B2
(45) Date of Patent: Jul. 2, 2024

(54) ARYL SCISSION INHIBITION IN ARYL-FUNCTIONALIZED POLYSILOXANE

(71) Applicant: Dow Silicones Corporation, Midland, MI (US)

(72) Inventors: Shengqing Xu, Midland, MI (US); Steven Swier, Midland, MI (US); Martijn A. Beukema, Brussels (BE)

(73) Assignee: Dow Silicones Corporation, Midland, MI (US)

(*) Notice: Subject to any disclaimer, the term of this patent is extended or adjusted under 35 U.S.C. 154(b) by 587 days.

(21) Appl. No.: 17/258,495

(22) PCT Filed: Aug. 19, 2019

(86) PCT No.: PCT/US2019/046985
§ 371 (c)(1),
(2) Date: Jan. 7, 2021

(87) PCT Pub. No.: WO2020/060702
PCT Pub. Date: Mar. 26, 2020

(65) Prior Publication Data
US 2021/0198450 A1   Jul. 1, 2021

Related U.S. Application Data

(60) Provisional application No. 62/733,094, filed on Sep. 19, 2018.

(51) Int. Cl.
*C08K 5/19* (2006.01)
*C08G 77/00* (2006.01)
*C08K 3/26* (2006.01)
*C08K 3/34* (2006.01)
*C08K 3/36* (2006.01)
*C08L 83/04* (2006.01)
*C09D 183/04* (2006.01)

(52) U.S. Cl.
CPC ............... *C08K 5/19* (2013.01); *C08G 77/80* (2013.01); *C08K 3/26* (2013.01); *C08K 3/346* (2013.01); *C08K 3/36* (2013.01); *C08L 83/04* (2013.01); *C09D 183/04* (2013.01); *C08K 2003/265* (2013.01)

(58) Field of Classification Search
CPC ........... C08K 5/19; C08G 77/80; C08L 83/04; C09D 183/04; C09J 183/04
See application file for complete search history.

(56) References Cited

U.S. PATENT DOCUMENTS

| | | |
|---|---|---|
| 2,518,160 A | 8/1950 | Mathes |
| 2,906,734 A | 9/1959 | Clark |
| 3,135,713 A | 6/1964 | Brewer et al. |
| 3,812,081 A * | 5/1974 | Dennis et al. ........... C08K 5/19 528/21 |
| 4,611,040 A * | 9/1986 | Olson ..................... C08K 3/16 528/21 |
| 5,302,683 A | 4/1994 | Weidner et al. |
| 6,040,366 A | 3/2000 | Burkus, II et al. |
| 6,296,944 B1 | 10/2001 | Stein |
| 6,368,535 B1 | 4/2002 | Katsoulis et al. |
| 7,649,059 B2 | 1/2010 | Yoshitake et al. |
| 8,030,429 B2 | 10/2011 | Sugiura et al. |
| 8,372,384 B2 | 2/2013 | Chisholm et al. |
| 8,389,649 B2 | 3/2013 | Suwa et al. |
| 8,445,560 B2 | 5/2013 | Lecomte |
| 8,754,146 B2 | 6/2014 | Ziolkowski et al. |
| 9,550,866 B2 | 1/2017 | Schmidt et al. |
| 9,688,035 B2 | 6/2017 | Swier et al. |
| 9,695,202 B2 | 7/2017 | Henning et al. |
| 2014/0191161 A1 | 7/2014 | Amako et al. |
| 2020/0216670 A1 * | 7/2020 | Yano ..................... C08G 77/28 |

FOREIGN PATENT DOCUMENTS

| | | |
|---|---|---|
| JP | H0686582 | 11/1994 |
| JP | 2007-279135 A * | 10/2007 |
| TW | 200809401 | 2/2008 |

OTHER PUBLICATIONS

Machine translation of JP 2007-279135 (no date).*
"The Effect of Phenyl Content on the Degradation of Poly(dimethyldiphenyl)siloxane Copolymers" authored by Deshpande et al. and published in Polymer Degradation and Stability (2001) 74, 363-370.*
"Comparative Thermal Stability of Homopolysiloxane and Copolysiloxanes of Dimethyl/Diphenyl Silanes" authored by Mazhar et al. and published in the Journal of the Chemical Society of Pakistan (1990) 12(3) 225-229.*
Search Report from corresponding Chinese Application No. 201980055532.6 dated Sep. 26, 2022.

* cited by examiner

Primary Examiner — Marc S Zimmer
(74) Attorney, Agent, or Firm — Steven W. Mork

(57) ABSTRACT

A composition contains an aryl-functionalized polysiloxane and quaternary ammonium compound, where the quaternary ammonium compound has an anion selected from a group consisting of: halides, salicylate, octanoate, acetate, dihydrogen citrate, maleate, hydrogenglutaric acid anion, and bistartaric acid anion.

8 Claims, No Drawings

ARYL SCISSION INHIBITION IN ARYL-FUNCTIONALIZED POLYSILOXANE

BACKGROUND OF THE INVENTION

Field of the Invention

The present invention relates to a composition containing an aryl-functionalized polysiloxane and a specific quaternary ammonium compound that inhibits aryl scission of the aryl-functionalized polysiloxane.

INTRODUCTION

Aryl-functionalized polysiloxanes, such as phenyl-functionalized polysiloxanes and substituted phenyl-functionalized polysiloxanes, tend to be thermally unstable, having a propensity to undergo thermally induced aryl scission at elevated temperatures. The propensity for thermally induced aryl scission is greater when the aryl-functionalized polysiloxane contains silanol functionality. Such thermally induced aryl scission is undesirable and is a challenge for many applications of aryl-functionalized polysiloxanes.

Aryl-functionalized polysiloxanes are useful as coatings, encapsulants and adhesives in applications that can experience temperatures of 120 degrees Celsius (° C.) or more, 150° C. or more, 180° C. or more and even 200° C. or more. At these temperatures, aryl scission can undesirably produce aromatic byproducts such as benzene and/or cause the aryl-functionalized polysiloxane to yellow and/or become hard and brittle in an air environment.

Often, aryl-functionalized polysiloxanes used as elastomers, coatings, encapsulants and adhesives are applied as an aryl-functionalized polysiloxane and cured to form a cross-linked aryl-functionalized polysiloxane. Aryl scission is a concern before, during and after curing of such aryl-functionalized polysiloxanes. Curing can occur via crosslinking by condensation reactions of aryl-functionalized polysiloxanes that are silanol functionalized. Curing can also occur via crosslinking by hydrosilation reactions through an unsaturated carbon-carbon bond whether the aryl-functionalized polysiloxane contains a silanol functionality or not. The presence of silanol tends to increases the propensity for thermally induced aryl scission.

It would advance the art of aryl-functionalized polysiloxane technology to find a way to inhibit thermally induced aryl scission of aryl-functionalized polysiloxane. It would be especially desirable to identify a way to inhibit thermally induced aryl scission for aryl-functionalized polysiloxanes that are silanol functionalized. It would be even more desirable if, at the same time, there was a way to inhibit aryl scission of aryl-functionalized polysiloxane, with or without silanol functionality, at temperatures of 120° C. or more, 150° C. or more, especially 180° C. or more and even 200° C. or more.

BRIEF SUMMARY OF THE INVENTION

As part of the discovery of the present invention, it was surprisingly and unexpectedly discovered that an additional problem is that thermally induced aryl scission of aryl-functionalized polysiloxanes occurs more readily when an aryl-functionalized polysiloxane is in the presence of inorganic particulates. That is, the extent of aryl scission that occurs in an aryl-functionalized polysiloxane increases when the aryl-functionalized polysiloxane is in the presence of inorganic particulates such as calcium carbonate, talc, silica and clay particles.

The present invention provides a solution to the problem of inhibiting thermally induced aryl scission of aryl-functionalized polysiloxanes, such as phenyl-functionalized polysiloxanes and substituted phenyl-functionalized polysiloxanes. Moreover, the present invention provides a solution to the problem of inhibiting thermally induced aryl scission of aryl-functionalized polysiloxanes that are silanol functionalized. At the same time, the present invention provides a solution to the problem of aryl scission of such aryl-functionalized polysiloxanes at temperatures of 120° C. or more, 150° C. or more, especially 180° C. or more and even 200° C. or more. Even more, in addition to solving the aforementioned problems, the present invention solves the problem of inhibiting aryl scission of aryl-functionalized polysiloxanes in the presence of inorganic particulates such as calcium carbonate, talc, silica and clay particles.

The present invention is a result of surprisingly and unexpectedly discovering that certain, but not all, quaternary ammonium compounds inhibit thermally induced aryl scission of aryl-functionalized polysiloxane when mixed with the aryl-functionalized polysiloxane, even when the polysiloxane is silanol functionalized, and even when it is in the presence of inorganic particulates, including metal catalysts. The quaternary ammonium compounds, in the broadest scope, can have any cationic nitrogen component. However, the anion of the quaternary ammonium compound must be selected from a group consisting of halides (such as chloride and bromide), salicylate (2-hydroxybenzoate), octanoate ($CH_3(CH_2)_6COO^-$), acetate ($CH_3COO^-$), dihydrogen citrate ($C_6H_7O_7^-$),

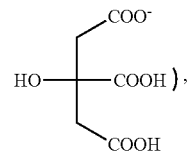

maleate ($-O_2CCHCHCO_2$), hydrogenglutaric acid anion ($HO_2C(CH_2)_3)CO_2^-$), and bistartaric acid anion (HOOC $(CHOH)_2COO^-$). When such a quaternary ammonium compound is mixed with aryl-functionalized polysiloxane, aryl scission is dramatically reduced, even at temperatures of 120° C. or higher, 150° C. or higher, 180° C. or higher and even at temperatures of 200° C. or higher, even when the aryl-functionalized polysiloxane has silanol functionality and even when in the presence of inorganic particulates.

In a first aspect, the present invention is a composition comprising an aryl-functionalized polysiloxane and quaternary ammonium compound, where the quaternary ammonium compound has and anion selected from a group consisting of: halides, salicylate, octanoate, acetate, dihydrogen citrate, maleate, hydrogenglutaric acid anion and bistartaric acid anion.

In a second aspect, the present invention is a process comprising heating the composition of the first aspect to a temperature of 120° C. or higher, 150° C. or higher, 180° C. or higher, or even 200° C. or higher.

The present invention is useful for inhibiting thermally induced aryl scission in aryl-functionalized silicone-base polymers whether cured, non-cured or as they are curing, thereby enhancing the thermal stability of aryl-functionalized coatings, encapsulants and adhesives.

DETAILED DESCRIPTION OF THE INVENTION

Test methods refer to the most recent test method as of the priority date of this document if a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut fir Normung; and ISO refers to International Organization for Standardization.

"Multiple" means two or more. "And/or" means "and, or as an alternative". All ranges include endpoints unless otherwise indicated. Molecular weight refers to weight-average molecular weight unless otherwise stated. Determine molecular weight by gel permeation chromatography using polystyrene standards.

The present invention is a composition. The composition can be in any form as long as it contains the requisite components. For example, the composition can be a volume of liquid, a coating, an encapsulant, and elastomer, and/or a film. The composition can be a composition useful for curing by condensation and/or hydrosilation. Additionally, or alternatively, the composition can comprise a polysiloxane that has been cured by condensation and/or hydrosilation. The composition can at least partially and even entirely cover an article. For example, the composition can be an encapsulant around a light emitting diode or a film over another material. The composition is also useful as an adhesive between two components.

The composition comprises an aryl-functionalized polysiloxane. An aryl-functionalized polysiloxanes contains an aryl functionality attached to a silicone atom. The aryl functionality can be, for example, phenyl or a substituted phenyl group. Substituted phenyl groups are phenyl groups where one or more than one of the hydrogens of the phenyl group is substituted with something other than hydrogen. The aryl-functionalized polysiloxane can comprise or consist of any combination of M, D, T, and Q siloxane units. "M" units correspond to units having the following structure: $R^1R^2R^3SiO_{1/2}$; "D" units correspond to units having the following structure: $R^3R^4SiO_{2/2}$; "T" units correspond to units having the following structure: $R^5SiO_{3/2}$; and "Q" units correspond to units having the following structure: $SiO_{4/2}$; where $R^1$, $R^2$, $R^3$, $R^4$ and $R^5$ are independently in each occurrence selected from hydrogen, alkyl groups, aryl groups, hydroxyl, halogen or any other pendant group provided there is at least one R group that is an aryl group (that is, an aryl functionality). Preferably, the aryl-functionalized polysiloxane comprises 30 mole-percent or more, preferably 40 mole-percent or more, and more preferably 50 mole-percent or more aryl substituted siloxane units relative to total moles of siloxane units. Determine mole-percent aryl substituted siloxane units by Silicon-29 nuclear magnetic resonance spectroscopy ($^{29}$Si NMR). Desirably, the aryl-functionalized polysiloxane contains 10 mole-percent or more, preferably 20 mole-percent or more, and more preferably 30 mole-percent or more T units based on total moles of siloxane units. Determine the mole-percent T units by $^{29}$Si NMR. Preferably, the aryl-functionalized polysiloxane contains 30 mole-percent or more aryl-functionalized T units (T units where the R group is an aryl). Determine mole-percent aryl-functionalized T units by $^{29}$Si NMR.

The aryl-functionalized polysiloxane can contain or be free of silanol functionality. Aryl-functionalized polysiloxane containing silanol functionality contain M, D and/or T siloxane units as described above where one or more than one of the R groups of a siloxane unit is a hydroxyl (—OH). Aryl scission is generally more prevalent in aryl-functionalized polysiloxane containing silanol functionality. Yet, surprisingly, compositions of the present invention demonstrate dramatically reduced aryl scission in even aryl-functionalized polysiloxanes with silanol functionality. The aryl-functionalize polysiloxane of the present invention can comprise one weight-percent (wt %) or more, two wt % or more, three wt % or more, four wt % or more, five wt % or more, six wt % or more, seven wt % or more, eight wt % or more, nine wt % or more and even 10 wt % or more while at the same time can comprise 10 wt % or less, nine wt % or less, eight wt % or less, seven wt % or less, six wt % or less, five wt % or less and even four wt % or less hydroxyl groups relative to aryl-functionalized polysiloxane. Determine wt % hydroxyl groups relative to aryl-functionalized polysiloxane as an average value by $^{29}$Si NMR.

Prepare aryl-functionalized polysiloxanes by standard methods known in the art. For example, polysiloxanes for use in the present invention can be made using the general procedures taught in U.S. Pat. Nos. 7,649,059, 9,550,866 and/or US20140191161.

The aryl-polysiloxane of the composition of the present invention can be cured (that is, crosslinked) or non-cured (non-crosslinked). Curing of aryl-polysiloxanes can occur by hydrosilation if the aryl-functionalized polysiloxane comprising silanol functionality. Curing of aryl-functionalized polysiloxanes can also, or alternatively, occur by hydrosilation regardless of whether the aryl-functionalized polysiloxane has silanol functionality provided it comprises unsaturated carbon-carbon bonds. These curing reactions are described further below.

The composition comprises a specific quaternary ammonium compound. It has been surprisingly and unexpectedly discovered that select quaternary ammonium compounds inhibit aryl scission of aryl-functionalized polysiloxanes. The quaternary ammonium compound has a quaternary ammonium cation component and an anion component. In the broadest scope of the invention, the cation can be any quaternary ammonium cation. Quaternary ammonium compounds with a N,N,N-trimethyl ethanolammonium cation (also known as "choline") are particularly effective at inhibiting aryl scission. The anion of the quaternary ammonium compound is selected from a group consisting of halides, salicylate (2-hydroxybenzoate), octanoate ($CH_3(CH_2)_6COO^-$), acetate ($CH_3COO^-$), dihydrogen citrate, maleate, hydrogenglutaric acid anion ($HO_2C(CH_2)_3CO_2^-$), and bis-tartaric acid anion. The halide is desirably selected from chloride and bromide. The composition can comprise a single type of quaternary ammonium compound or multiple different types of the quaternary ammonium compounds.

The concentration of quaternary ammonium compounds in the composition is generally 0.01 wt % or more, preferably 0.05 wt % or more, more preferably 0.1 wt % or more, still more preferably 0.5 wt % or more, even more preferably 1.0 wt % or more and can be 2.0 wt % or more, 3.0 wt % or more, 4.0 wt % or more, 5.0 wt % or more, and can be 10 wt % or more and even 15 wt % or more while at the same time is generally 20 wt % or less, typically 15 wt % or less and can be 14 wt % or less, 13 wt % or less, 12 wt % or less, 11 wt % or less, 10 wt % or less, 9.0 wt % or less, 8.0 wt % or less, 7.0 wt % or less, 6.0 wt % or less and even 5.0 wt % or less where wt % is the weight percent of total quaternary ammonium compound relative to aryl-containing polysiloxane weight.

The composition can further comprise an inorganic particulates. Inorganic particulates are particulates of inorganic material. It was discovered that when inorganic particulates are present in a composition of aryl-functionalized polysiloxane the extent of aryl scission that occurs upon heating the composition is greater than when the inorganic particulates are absent. Hence, inorganic particulates tend to facilitate aryl scission of aryl-functionalized polysiloxane. Nonetheless, it has further been surprisingly and unexpectedly discovered that the specific quaternary ammonium compound of the present invention inhibits aryl scission of aryl-functionalized polysiloxane even in the presence of inorganic particulates. Any inorganic particulate is expected to facilitate aryl scission.

Inorganic particulates include any one or combination of more than one particulate of the following materials: minerals of sulfides, sulfosalts, oxides, hydroxides, halides, carbonates, nitrates, borates, sulfates, phosphates, silicates, mica, talc, calcium carbonate, magnesium carbonate, zinc carbonate, magnesium chloride, zinc stearate, zinc oxide, titanium dioxide, zirconium dioxide, wollastonite (calcium silicate), glass, aluminum hydroxide, aluminum silicate, antimony trioxide, barium ferrite, barytes (barium sulfate), calcium sulfate, silica, clay, Frankin fiber, iron silicate, litharge, lithopone, pyrophyllite, gypsum, perlite, phyllosilicates, vermiculite, barite, and inorganic phosphor. Inorganic particulates include one or more than one inorganic filler selected from a group consisting of calcium carbonate, talc, silica and clay (such kaolin clay).

Inorganic phosphor is commonly included inorganic particulate when the composition is used in producing light-emitting semiconductor components. Inorganic phosphor fillers include cerium (Ce)-doped yttrium aluminum garnet (YAG) phosphors, cerium-doped garnet phosphors containing at least one element selected from yttrium (Y), lutetium (Le), scandium (Sc), lanthanum (La), gadolinium (Gd) and samarium (Sm) and at least one element selected from aluminum (Al), gallium (Ga) and Indium (In). Inorganic phosphor can also be other garnets doped with rare earths such as $Y_3Ga_5O_{12}:Ce^{3+}$, $Y(Al,Ga)_5O_{12}:Ce^{3+}$ and $Y(Al,Ga)_5O_{12}:Tb^{3+}$, as well as alkaline earth metal sulfides doped with rare earths, such as $SrS:Ce^{3+}$, Na, $SrS:Ce^{3+}$, Cl, $Srs:CeCl_3$, $CaS:Ce^{3+}$ and $SrSe:Ce^{3+}$. The thiogallates doped with rare earths, for example, $CaGa_2S_4:Ce^{3+}$ and $SrGa_2S_4:Ce^{3+}$, and aluminates doped with rare earths, such as, for example, $YAlO_3:Ce^{3+}$, $YGaO_3:Ce^{3+}$, $Y(Al,Ga)O_3Ce^{3+}$, and orthosilicates $M_2SiO_5:Ce^{3+}$ (M:Sc, Y, Sc) doped with rare earths, such as, for example, $Y_2SiO_5:Ce^{3+}$, and all of the yttrium compounds, scandium compounds or lanthanum compounds Organometallic catalysts can also be included in the composition and are a form of inorganic particulate. Organometallic catalysts can facilitate reactions such as hydrosilation of the aryl-functionalized polysiloxane. Organometallic catalysts include organometallic compounds containing a metal selected from a group consisting of platinum, titanium, zirconium, tin, zinc, bismuth, cobalt, iron, vanadium and cadmium.

Inorganic particulates can be present in the composition at a concentration of zero wt % or more, 0.1 wt % or more, 0.5 wt % or more, 1.0 wt % or more, 2.0 wt % or more, 3.0 wt % or more, 4.0 wt % or more, 5.0 wt % or more, 6.0 wt % or more, 7.0 wt % or more, 8.0 wt % or more, and even 9.0 wt % or more, 10 wt % or more, 25 wt % or more, 50 wt % or more and even 100 wt % or more while at the same time are generally present at a concentration of 500 wt % or less, 300 wt % or less, 250 wt % or less, 200 wt % or less, 150 wt % or less, 100 wt % or less, 75 wt % or less, 50 wt % or less 25 wt % or less, or even 10 wt % or less relative to the weight of aryl-functionalized polysiloxane.

A desirable feature of the composition of the present invention is that it unexpectedly and surprisingly experiences less aryl scission than the same composition without the quaternary ammonium compound, or with a different quaternary ammonium compound. In particular, this unexpected and surprising result is true at temperatures of 120° C. and higher, 150° C. or higher, 180° C. or higher, and even at temperatures of 200° C. or higher. Hence, the present invention also includes a process comprising heating the composition of the present invention to a temperature of 120° C. or higher, 150° C. or higher, 180° C. or higher, and even 200° or higher. The process can further include applying the composition of the present invention to a substrate (for example, coating or encapsulating or adhering a substrate with the composition) and heating to 120° C. or higher, 150° C. or higher, 180° C. or higher, and even 200° C. or higher before, during and/or after applying the composition to the substrate. Beneficially, the process results in less aryl scission of the aryl-functionalized polysiloxane than an identical process using a composition that does not contain the quaternary ammonium compound specified for the composition of the present invention. The reduction in aryl scission is often one or more, two or more and even three or more orders of magnitude relative to an identical formulation without the quaternary ammonium compound specified for the present invention.

The composition of the present invention can be used, for example, as an adhesive, a coating, an encapsulant, an elastomer or a gel. The process of the present invention can include applying the composition to a substrate. The process can further include inducing crosslinking of the aryl-functionalized polysiloxane before, during and/or after applying the composition to a substrate. For example, the process of the present invention can be one or more process selected from condensation and hydroxylation.

Crosslinking of aryl-functionalized polysiloxanes in compositions of the present invention can be accomplished by condensation reactions when the aryl-functionalized polysiloxane also includes silanol functionality. Generally, the concentration of silanol hydroxyl must exceed one wt % of the aryl-functionalized polysiloxane to achieve condensation or the hydroxyls will not be exposed on the surface of the polymer sufficiently to effectively participate in condensation. The composition can experience temperatures of 120° C. or higher, 150° C. or higher, 180° C. or higher, even 200° C. or higher before, during or after condensation so preventing aryl scission is important during condensation reactions of aryl-functionalized polysiloxanes.

Crosslinking of aryl-functionalized polysiloxanes in composition of the present invention can be accomplished by hydrosilation reactions with aryl-functionalized polysiloxanes without silanol functionality or with silanol functionality. Hydrosilation is an organometallic catalyzed reaction between hydrogen-silicon (hydrido, Si—H) groups and unsaturated carbon-carbon bonds. Hence, the composition of the present invention can comprise (or be free of, if not used in hydrosilation reactions) compounds having one or more than one unsaturated carbon-carbon bond. Unsaturated carbon-carbon bonds include carbon-carbon double bonds and carbon-carbon triple bonds. Compositions of the present invention used in hydrosilation reactions comprise both organometallic catalyst and components having one or more than one unsaturated carbon-carbon bond. The organometallic catalysis is as described previously above. Preferably, the organometallic catalyst is a platinum catalyst. The composition can experience temperatures of 120° C. or higher, 150° C. or higher, 180° C. or higher, even 200° C. or higher before, during or after hydrosilation so preventing aryl scission is important during hydrosilation reactions of aryl-functionalized polysiloxanes.

Applications of compositions of the present invention can require exposure to temperatures of 120° C. or higher, 150° C. or higher, 180° C. or higher, even 200° C. or higher and even 250° C. or higher. As already noted, the compositions can experience these temperatures during condensation or hydrosilation reactions. Even after such crosslinking reactions are done, or even if they do not occur, applications can require exposure to such temperatures. For example, compositions of the present invention are useful as a coating or encapsulant or elastomeric device over light emitting diodes (LEDs) and in such applications the composition can experience such temperatures. The compositions of the present invention are especially well suited for such applications because aryl scission is reduced at these temperatures for compositions of the present invention.

EXAMPLES

The following Examples (Exs) and Comparative Examples (Comp Exs) constitute compositions prepared and then tested for extent of aryl scission. Test results reveal that compositions of the present invention demonstrate significantly less aryl scission of aryl-functionalized polysiloxane than compositions outside the scope of the present invention.

The polysiloxanes used in the present examples can be prepared to the specified properties by known methods such as those taught in U.S. Pat. Nos. 7,649,059, 9,550,866 and/or US20140191161.

Aryl Scission Characterization

The compositions of the Examples and Comparative Examples contain phenyl-functionalized polysiloxanes that, upon aryl scission, generate benzene. Determine the thermal stability of a sample composition from the Examples and Comparative Examples to aryl scission by evaluating extent of benzene generation with gas chromatography with flame ionization detection (GC-FID) while holding the composition at 180° C. for 30 minutes. Submit 0.05 to 0.10 grams (g) of a sample composition into a closed 10 milliliter headspace of a gas chromatography apparatus (GC, Agilent HP 6890 FID Gas Chromatograph System, Hewlett Packard). Heat the sample to 180° C. for 30 minutes for analysis by gas chromatography with flame ionization detection (GC-FID) to check for the presence of benzene. The level of benzene in the headspace above the sample was determined by calibrating the GC using a full evaporation technique. The benzene generation in weight parts per million weight parts of sample (ppm) was calculated by the amount tested by GC-FID-headspace divided by the sample weight. A higher benzene generation from this test indicated a poorer thermal stability to aryl scission (that is, more extensive aryl scission). Similar analysis can be done for other aryl-functionalized polysiloxanes other than aryl-functionalized polysiloxanes by a similar method by quantifying the amount of aryl material generated in like manner as the amount of benzene was quantified for phenyl-functionalized polysiloxanes.

Aryl-Functionalized Polysiloxanes with Silanol

Aryl-functionalized polysiloxanes with silanol are commonly used in condensation reactions. The following examples illustrate that a quaternary ammonium compound within the scope of the present invention reduces aryl scission in such polysiloxanes, which is desirable for thermal stability of polysiloxanes in condensation reactions and reaction products.

Sample Preparation

Prepared sample compositions by combining components of the composition in a dental cup and mixing using a rotary mixer (SPEEDMIXER™ DAC 150 FVZ (FlackTek Inc.) for one minute at a spinning speed of 2,500 revolutions per minute. Form approximately 2 g of the resulting paste into a film by pressing between two lamination films and then dry at 70° C. for 30 minutes in a venting oven to remove the solvent to produce a sample composition.

Comp Ex A: Silanol Functionality and No Filler

Prepare Comp Ex A by combining 10.0 g of Resin A1 and 3.0 g of ethanol. Resin A1 is a polysiloxane characterized by the following formula: $T^{Ph}_{0.45}T_{0.40}D_{0.15}$ with 6.5 wt % —OH groups based on resin weight and having weight-average molecular weight of 3,055 grams per mole as determined by gel permeation chromatography using a polystyrene standard (for example RSN-0249 flake resin available from Dow Performance Silicones). Herein, "$T^{Ph}$" refers to a "$PhSiO_{3/2}$" unit, "T" refers to "$CH_3SiOM_{3/2}$" unit, and D refers to a "$(CH_3)_2SiO_{2/2}$" unit. Enough units are hydroxyl substituted to provide the specified amount of hydroxyl. Subscripts refer to the molar ratio of the different units in the polysiloxane resin.

Characterization results reveal 27 ppm benzene production in the Aryl Scission characterization. Aryl Scission characterization results are included in Table 1 for comparative purposes.

Comp Ex B: Silanol Functionality and Calcium Carbonate and Talc Fillers

Prepare and characterize Comp Ex B in like manner as Comp Ex A except combine 20 g of calcium carbonate (catalog number 239216 from Sigma-Aldrich) and 20 g of Talc ($3MgO*4SiO_2*H_2O$; powder with mesh of approximately 350; catalog number 420433 from Sigma-Aldrich) with the 10.0 g of Resin A1 and 3.0 g of ethanol.

Characterization results reveal 4868 ppm benzene production in the Aryl Scission characterization. Results reveal that the inorganic particulates dramatically increased the extent of aryl scission by over two orders of magnitude. Characterization results are included in Table 1 for comparative purposes.

Comp Exs C-F: Silanol Functionality, Inorganic Particulates and Additional Additives Prepare and characterize Comp Exs C-F in like manner as Comp Ex B except include in the composition inorganic particulates as noted in the Table 1 "Description". Characterization results are in Table 1. Comments indicate change in aryl scission relative to Comp Ex B.

Comp Exs GI: Silanol Functionality, Inorganic Particulates and "Out of Scope" Quats Prepare and characterize Comp Exs C-F in like manner as Comp Ex B except include in the composition quaternary ammonium compounds as noted in the Table 1 "Description". Characterization results are in Table 1. Comments indicate change in aryl scission relative to Comp Ex B (Comp Ex B indicate change relative to Comp Ex A). A reduction of 10× corresponds to an order of magnitude reduction and a reduction of 100× corresponds to two order of magnitude reduction.

TABLE 1

| Sample Composition | Description | Aryl Scission (ppm Benzene) | Change in aryl scission |
|---|---|---|---|
| Comp Ex A | Silanol and no filler | 27 | [Base Reference] |
| Comp Ex B | Silanol with CaCO₃ and Talc | 4868 | >100× increase |
| Comp Ex C | Comp B + 0.483 g aluminum acetylacetonate | 3042 | Negligible change in aryl scission |
| Comp Ex D | Comp Ex B + 0.369 g zinc 2-ethylhexanoate | 569 | 10× reduction |
| Comp Ex E | Comp Ex B + 0.451 g dibutyl tin dilaurate | 471 | 10× reduction |
| Comp Ex F | Comp Ex B + 0.407 g titanium (IV) oxyacetylacetonate | 411 | 10× reduction |
| Comp Ex G | Comp Ex B + 0.435 g tetrapropylammonium bisulfate | 328 | 10× reduction |
| Comp Ex H | Comp Ex B + 0.318 g tetramethylammonium hydroxide pentahydrate | 1059 | Mild reduction |

TABLE 1-continued

| Sample Composition | Description | Aryl Scission (ppm Benzene) | Change in aryl scission |
|---|---|---|---|
| Comp Ex I | Comp Ex B + 0.345 g tetramethylammonium borohydride | 1137 | Mild reduction |

Exs 1-31: Silanol Functionality, Inorganic Particulates and "In of Scope" Quats

Prepare and characterize Exs 1-31 in like manner as Comp Ex B except include in the composition quaternary ammonium compounds as noted in the Table 2 "Description". Characterization results are in Table 2 with Aryl Scission reporting ppm benzene and Change in phenyl scission indicating the extent of aryl scission reduction from the Comp Ex B reference. An aryl reduction of 10× corresponds to an order of magnitude reduction, 100× corresponds to two orders of magnitude reduction and 1000× corresponds to three orders of magnitude reduction.

Results of Table 2 reveal an extensive reduction of aryl scission when specific quaternary ammonium compounds are present, in contrast to an absence of quaternary ammonium compounds (Comp Ex B) or even the presence of "out of scope" quaternary compounds (Comp Exs G-I).

TABLE 2

| Sample | Description (Comp Ex B + the following quat) | Aryl Scission (ppm Benzene) | Change in aryl scission |
|---|---|---|---|
| Ex 1 | 0.101 g choline dihydrogencitrate salt | 4 | 1000× |
| Ex 2 | 0.107 g barium choline citrate [1] | 19 | >100× |
| Ex 3 | 0.299 g choline maleate [2] | 14 | >100× |
| Ex 4 | 0.548 g Choline glutarate [3] | 12 | >100× |
| Ex 5 | 1.070 g choline chloride | 1 | >1000× |
| Ex 6 | 0.077 g choline bistartrate | 7 | 1000× |
| Ex 7 | 0.826 g potassium choline citrate [4] | 44 | 100× |
| Ex 8 | 0.073 g 1-butyl-3-methylimidazolium acetate | 111 | >10× |
| Ex 9 | 1.040 g quaternary ammonium functional silicone 1 [5] | 4 | 1000× |
| Ex 10 | 0.324 g didecyldimethylammonium bromide | 8 | ~1000× |
| Ex 11 | 0.698 g tetramethylammonium bromide | 9 | ~1000× |
| Ex 12 | 0.633 g tetrabutylammonium bromide | 26 | >100× |
| Ex 13 | 0.485 g poly(diallyldimethylammonium chloride) | 49 | 100× |
| Ex 14 | 0.394 g glycidyltrimethylammonium chloride | 5 | 1000× |
| Ex 15 | 0.473 g 3-acrylamidopropyl trimethylammonium chloride | 2 | >1000× |
| Ex 16 | 0.409 g decamethonium bromide | 1 | >1000× |
| Ex 17 | 0.375 g N-trimethoxysilylpropyl-N,N,N-trimethylammonium chloride | 5 | 1000× |
| Ex 18 | 0.456 g choline octoate | 43 | 100× |
| Ex 19 | 0.143 g quaternary ammonium functional silicone 2 [6] | 6 | 1000× |
| Ex 20 | 0.508 g cetyltrimethylammonium bromide | 2 | >1000× |
| Ex 21 | 0.205 g dodcyltrimethylammonium bromide | 3 | >1000× |
| Ex 22 | 0.088 g octadecyldimethyl(3-trimethoxysilylpropyl) ammonium chloride. | 14 | >100× |
| Ex 23 | 1.472 g 1-allyl-3-methylimidizolium chloride | 6 | 1000× |
| Ex 24 | 0.104 g quaternary ammonium functional silicone 3 [7] | 29 | >100× |
| Ex 25 | 0.162 g quaternary ammonium functional silicone 4 [8] | 2 | >1000× |
| Ex 26 | 0.086 g choline salicylate | 1 | >1000× |
| Ex 27 | 1.044 g betaine | 161 | >10× |
| Ex 28 | 1.004 g 4-dimethylaminobutyric acid | 9 | 1000× |
| Ex 29 | 1.069 g 4-(dimethylamino)butyric acid hydrochloride | 11 | >100× |

TABLE 2-continued

| Sample | Description (Comp Ex B + the following quat) | Aryl Scission (ppm Benzene) | Change in aryl scission |
|---|---|---|---|
| Ex 30 | 3-(decyldimethylammonio)-propane-sulfonate | 21 | >100x |
| Ex 31 | 0.594 g tetrabutylammonium tetrafluoroborate | 13 | >100x |

[1] Reaction product of 1:2 molar ratio of Choline dihydrogencitrate salt and barium hydroxide octahydrate.
[2] Reaction product of 2:1 molar ratio of Choline hydroxide and maleic acid.
[3] Reaction product of 1:1 molar ratio of Choline hydroxide and glutaric acid.
[4] Reaction product of 1:2 molar ratio of Choline dihydrogencitrate salt and potassium hydroxide.
[5] Reaction product of 1:2 molar ratio of aminoethylaminoisobutyl terminated polydimethylsiloxane and glycidyltrimethyl ammonium chloride.
[6] Reaction product of 1:2 molar ratio of aminopropyl terminated polydimethylsiloxane and glycidyl trimethylammonium chloride.
[7] Reaction product of 1:2 molar ratio of ethylaminoisobutyl terminated polydimethylsiloxane and glycidyl trimethylammonium chloride.
[8] Reaction product of 2:1 molar ratio of choline hydroxides and Gelest DMS-Z21.

Exs 32-36 and Comp Exs J-M: Various Phenyl-Functionalized Polysiloxanes with Silanol Functionality The following pairs of Exs and Comp Exs illustrate the ability of quaternary ammonium compounds within the scope of the present invention to inhibit aryl scission for different aryl-functionalized polysiloxanes with silanol functionality.

Comp Ex A and Ex 32. Prepare Ex 32 in like manner as Comp Ex A except include 0.147 g choline salicylate. Aryl Scission characterization reveals 27 ppm benzene for Comp Ex A and 4 ppm benzene for Ex 32.

Comp Ex J and Ex 33. Prepare Comp Ex J in like manner as Comp Ex A except use Resin A2 as the polysiloxane, where Resin A2 has the following formula: $D_{0.19}D^{Ph}_{0.19}T_{0.25}T^{Ph}_{0.37}$ with one wt % —OH by weight of resin and weight-average molecular weight of 200,000 grams per mole (for example, Dowsil™ RSN-0806 flake resin from Dow Performance Silicones). "$D^{Ph2}$" corresponds to $(Ph)_2SiO_{2/2}$ units. Prepare Ex 33 in like manner as Comp Ex J except include 0.106 g choline salicylate. Aryl Scission characterization reveals 547 ppm benzene for Comp Ex J and 30 ppm benzene for Ex 33.

Comp Ex K and Ex 34. Prepare Comp Ex K in like manner as Comp Ex A except use Resin A3 as the polysiloxane, where Resin A3 has the following formula: $D_{0.19}D^{Ph}_{0.19}T_{0.25}T^{Ph}_{0.37}$ with 3 wt % —OH by weight of resin and weight-average molecular weight of 3,000 grams per mole (for example, Dowsil™ RSN-0840 flake resin from Dow Performance Silicones). Prepare Ex 34 in like manner as Comp Ex K except include 0.104 g choline salicylate. Aryl Scission characterization reveals 3751 ppm benzene for Comp Ex K and 89 ppm benzene for Ex 34.

Comp Ex L and Ex 35. Prepare Comp Ex L in like manner as Comp Ex A except use Resin A4 as the polysiloxane (see synthesis, below) and 4 g of toluene as the solvent instead of 3 g of ethanol and include 0.002 g diazabicyclo[5.4.0]undec-7-ene from Aldrich. Prepare Ex 35 in like manner as Comp Ex L except include 0.106 g choline salicylate. Aryl Scission characterization reveals 1199 ppm benzene for Comp Ex L and 2 ppm benzene for Ex 35.

Synthesis for Resin A4: Add to a 5-liter 4-nick round bottom flask 450.0 g of $T^P$ resin having a weight-average molecular weight of 2,600 g per mole and a —OH content of 8.5 weight-percent of the resin weight (for example, Dowsil™ RSN-0217 Flake) and 703.8 g of toluene. Equip the flask with a thermometer, Teflon stir paddle and a Dean Stark apparatus attached to a water-cooled condenser. Apply a nitrogen blanket. Prefill the Dean Stark apparatus with toluene. Use and oil bath to heat the flask contents. Heat the reaction flask contents to reflux for 30 minutes, then cool to 108° C. and quickly add a solution of diacetoxy terminated PhMe siloxane. Prepare the diacetoxy terminated PhMe siloxane by adding a 50/50 w/w MTA/ETA (12.1 g, 0.0523 moles Si) mixture to a solution of α,ω-silanol terminated poly(methylphenylsiloxane) with a degree of polymerization (DP) of 140 (550.0 g, 4.04 moles Si) dissolved in toluene (296.2 g). Mix the solution for 2 hours at 23° C. under a nitrogen atmosphere. After adding diacetoxy terminated PhMe siloxane, heat the mixture to reflux for 2 hours. Add 79.9 g 50/50 wt % MTA/ETA (79.9 g, 0.346 moles Si) at 108° C. Heat the reaction mixture at reflux for one hour. Cool to 90° C. and add 120 milliliters deionized water. Increase the temperature to reflux and remove the water by azeotropic distillation. Cool the reaction mixture again to 90° C. and add another 120 milliliters of deionized water. Heat to reflux and remove water again by azeotropic distillation. Remove 569.0 g toluene to increase solids content. Cool to 23° C. and filter through a 5.0 micrometer filter to obtain Resin A4. Resin A4 has the following composition: $D^{Ph}_{0.55}T^{Ph}_{0.45}$ with a weight-average molecular weight of 18,600 grams per mole and an —OH content of 2.4 weight-percent (wt %) relative to resin weight.

Comp Ex M and Ex 36. Prepare Comp Ex M in like manner as Comp Ex L except use 0.018 g aluminum acetylacetonate instead of 0.002 g diazabicyclo [5.4.0]undec-7-ene from Aldrich. Prepare Ex 36 in like manner as Comp Ex M except include 0.100 g choline salicylate. Aryl Scission characterization reveals 5700 ppm benzene for Comp Ex M and 3 ppm benzene for Ex 36.

Comp Exs N and O and Exs 37 and 38: Different Inorganic Particulates

The following pairs of Exs and Comp Exs illustrate the ability of quaternary ammonium compounds within the scope of the present invention to inhibit aryl scission in the presence of inorganic particulates covering different character relative to calcium carbonate and talc.

Comp Ex N and Ex 37. Prepare Comp Ex N in like manner as Comp Ex A except further include 25 g precipitated amorphous silica (for example, Zeosil 1165MP from Solvay). Prepare Ex 37 in like manner as Comp Ex N except further include 0.152 g choline salicylate. Aryl Scission characterization reveals 1177 ppm benzene for Comp Ex N and 94 ppm benzene for Ex 37.

Comp Ex O and Ex 38. Prepare Comp Ex 0 in like manner as Comp Ex N except use kaolin claim (such as Polyplate HTM from Kamin) instead of precipitated amorphous silica. Prepare Ex 38 in like manner as Comp Ex 0 except further include 0.137 g choline salicylate. Aryl Scission characterization reveals 6747 ppm benzene for Comp Ex O and 33 ppm benzene for Ex 38.

Comp Exs P-W and Exs 39-46: Presence of Different Crosslinkers

The following groups of Comp Exs and Exs illustrate the reduction of aryl scission also occurs in the presence of different crosslinkers, with and without kaolin clay inorganic particulate.

Comp Exs P and Q and Exs 39 and 40. Prepare Comp Ex P in like manner as Comp Ex A except use 3 g of 2-butanoone instead of ethanol and include 0.67 g ethyltriacetoxyilane. Prepare Ex 39 in like manner as Comp Ex P except include 0.129 g choline salicylate. Prepare Comp Ex Q and Ex 40 in like manner as Comp Ex P and Ex 39, respectively, except include 19.2 g kaolin clay (Polyplate HMT). Aryl Scission characterization reveals 14 ppm benzene for Comp Ex P and 7 ppm benzene for Ex 39; and 13,207 ppm for Comp Ex Q and 40 ppm for Ex 40.

Comp Exs R and S and Exs 41 and 42. Prepare Comp Exs R and S and Exs 41 and 42 in like manner as Comp Exs P and Q and Exs 39 and 40, respectively, except use 0.62 g of methyltrimethoxysilane instead of 0.67 g ethyltriacetoxysilane. Aryl Scission characterization reveals 39 ppm benzene for Comp Ex R and 14 ppm benzene for Ex 41; and 693 ppm for Comp Ex S and 59 ppm for Ex 42.

Comp Exs T and U and Exs 43 and 44. Prepare Comp Exs T and U and Exs 43 and 44 in like manner as Comp Exs P and Q and Exs 39 and 40, respectively, except use 0.69 g of vinyltriisopropenoxysilane instead of 0.67 g ethyltriacetoxysilane. Also, use 0.27 g choline salicylate in Ex 43 and 0.224 g choline salicylate in Ex 44. Aryl Scission characterization reveals 10 ppm benzene for Comp Ex T and 6 ppm benzene for Ex 4431; and 3682 ppm for Comp Ex U and 55 ppm for Ex 44.

Comp Exs V and W and Exs 45 and 46. Prepare Comp Exs V and W and Exs 45 and 46 in like manner as Comp Exs P and Q and Exs 39 and 40, respectively, except use 0.0.98 g of methyltris(methylethylketoxime instead of 0.67 g ethyltriacetoxysilane. Also, sue 0.184 g choline salicylate in Ex 45 and 0.186 g choline salicylate in Ex 46. Aryl Scission characterization reveals 20 ppm benzene for Comp Ex V and 11 ppm benzene for Ex 45; and 1850 ppm for Comp Ex W and 28 ppm for Ex 46.

Aryl-Functionalized Polysiloxanes with Carbon-Carbon Unsaturation

Aryl-functionalized polysiloxanes with carbon-carbon unsaturation (carbon-carbon unsaturated bonds) are useful in hydrosilation reactions. The following examples illustrate that a quaternary ammonium compound within the scope of the present invention reduces aryl scission in such polysiloxanes, which is desirable for thermal stability of polysiloxanes in hydrosilation reactions and reaction products.

The following examples and comparative examples explore aryl scission inhibition in platinum-catalyzed hydrosilation formulations with aryl-functionalized polysiloxanes with carbon-carbon unsaturation.

Sample Preparation

Add all ingredients into a dental cup. Mix the ingredients together using a rotary mixer (SPEEDMIXER™ DAC 150 FVZ (FlackTek Inc., Landrum, SC)) for one minute at a spinning speed of 2,500 revolutions per minute. Pour the resulting liquid mixture into an aluminum pan and cure into a solid elastomer at 130° C. for 15 minutes. Evaluate for aryl scission as described previously, above.

Table 3 identifies the polymer, resins and crosslinkers used in the hydrosilation samples. For polymer and resin identification "Vi" refers to a vinyl group and "Ep" refers to a glycidoxypropyl group. Subscripts for parenthetical units in the molecular formula indicates average molar ratio of those units per molecule.

TABLE 3

| Component | Description | Source |
|---|---|---|
| Polymer 1 | $Me_2ViSiO(MePhSiO)_{25}OSiMe_2Vi$ 4,430 g/mole weight average molecular weight | MP-153SP from Dow Performance Silicones. |
| Resin HS1 | $(Me_2ViSiO_{1/2})_{0.25}(PhSiO_{3/2})_{0.75}$ 1,480 g/mole weight average molecular weight | RMS-310 from Dow Performance Silicones. |
| Resin HS2 | $(Me_2ViSiO_{1/2})_{0.10}(MeViSiO_{1/2})_{0.15}(PhSiO_{3/2})_{0.75}$ 1,350 g/mole weight average molecular weight | RMS-311 from Dow Performance Silicones. |
| Resin HS3 | $(Me_2ViSiO_{1/2})_{0.18}(PhSiO_{3/2})_{0.54}(EpMeSiO_{1/2})_{0.28}$ 2,110 g/mole weight average molecular weight | APZ-55 from Dow Performance Silicones. |
| Crosslinker 1 | $HMe_2SiO(Ph_2SiO)SiMe_2H$ | RMS-352 from Dow Performance Silicones. |
| Crosslinker 2 | $(HMe_2SiO_{1/2})_{0.60}(PhSiO_{3/2})_{0.40}$ 750 g/mole weight average molecular weight | RMS-356 from Dow Performance Silicones. |

Comp Ex X and Ex 47: Reference Formulation Without and With Quat

Prepare a sample with 2.5 g Polymer 1, 4.93 g Resin HS1, 0.65 g Resin HS2, 0.25 g Resin HS3, 1.4 g Crosslinker 1, 0.16 g Crosslinker 2, 0.2 g cyclic $(ViSiMeO_{1/2})_4$, 0.002 g 1-ethynyl-1-cyclohexanol as an inhibitor, and 0.00002 g Pt(1,3-divinyltetramethylsiloxane) complex as a catalyst. Aryl Scission characterization reveals 519 ppm benzene.

Prepare a sample composition in like manner as Comp Ex X except further include 0.150 g choline salicylate. Aryl Scission characterization reveals 11 ppm benzene, demonstrating reduction of aryl scission relative to the same formulation without choline salicylate.

Comp Exs Y-II and Exs 48-58: Effect of Different Fillers

The following pairs of examples and comparative examples illustrate the aryl-scission reduction effect of in scope quaternary ammonium components on aryl-functionalized polysiloxanes with carbon-carbon unsaturation in the presence of various fillers.

Comp Ex Y and Ex 48. Prepare Comp Ex Y in like manner to Comp Ex X but include 3.33 g talc and 3.33 g calcium carbonate. Prepare Ex 48 in like manner as Comp Ex Y except include 0.161 g choline salicylate. Aryl Scission characterization reveals 911 ppm benzene for Comp Ex Y and 25 ppm benzene for Ex 48.

Comp Ex Z and Ex 49. Prepare Comp Ex Z in like manner to Comp Ex X but include 1.98 g Titanium oxide (TiO$_2$, Sigma-Aldrich, catalog number 634662). Prepare Ex 49 in like manner as Comp Ex Z except include 0.125 g choline salicylate. Aryl Scission characterization reveals 835 ppm benzene for Comp Ex Z and 7 ppm benzene for Ex 49.

Comp Ex AA and Ex 50. Prepare Comp Ex AA in like manner to Comp Ex X but include 3.33 g precipitated amorphous silica (Zeosil 1165MP from Solvay). Prepare Ex 50 in like manner as Comp Ex AA except include 0.151 g choline salicylate. Aryl Scission characterization reveals 2177 ppm benzene for Comp Ex AA and 69 ppm benzene for Ex 50.

Comp Ex BB and Ex 51. Prepare Comp Ex BB in like manner to Comp Ex X but include 4.32 g zinc oxide (Kadox 920 from Zinc Corporation of America (Monaca, PA)). Prepare Ex 51 in like manner as Comp Ex BB except include 0.125 g choline salicylate. Aryl Scission characterization reveals 190 ppm benzene for Comp Ex BB and 37 ppm benzene for Ex 51.

Comp Ex CC and Ex 52. Prepare Comp Ex CC in like manner to Comp Ex X but include 3.33 g magnesium hydroxide (from Sigma-Aldrich, catalog number 310093). Prepare Ex 52 in like manner as Comp Ex CC except include 0.109 g choline salicylate. Aryl Scission characterization reveals 44 ppm benzene for Comp Ex BB and 14 ppm benzene for Ex 51.

Comp Ex DD and Ex 53. Prepare Comp Ex DD in like manner to Comp Ex X but include 4.56 g iron (II) oxide (from Sigma-Aldrich, catalog number 310050). Prepare Ex 53 in like manner as Comp Ex DD except include 0.142 g choline salicylate. Aryl Scission characterization reveals 113 ppm benzene for Comp Ex DD and 2 ppm benzene for Ex 53.

Comp Ex EE and Ex 54. Prepare Comp Ex EE in like manner to Comp Ex X but include 10 g cerium (IV) oxide (from Sigma-Aldrich, catalog number 211575). Prepare Ex 54 in like manner as Comp Ex EE except include 0.131 g choline salicylate. Aryl Scission characterization reveals 114 ppm benzene for Comp Ex EE and 5 ppm benzene for Ex 54.

Comp Ex FF and Ex 55. Prepare Comp Ex FF in like manner to Comp Ex X but include 6.66 g alumina (AA-3 from Sumitomo). Prepare Ex 55 in like manner as Comp Ex FF except include 0.126 g choline salicylate. Aryl Scission characterization reveals 404 ppm benzene for Comp Ex FF and 6 ppm benzene for Ex 55.

Comp Ex GG and Ex 56. Prepare Comp Ex GG in like manner to Comp Ex X but include 6.66 g kaolin clay (polyplate HMT from Kamin). Prepare Ex 56 in like manner as Comp Ex GG except include 0.135 g choline salicylate. Aryl Scission characterization reveals 516 ppm benzene for Comp Ex GG and 11 ppm benzene for Ex 56.

Comp Ex HH and Ex 57. Prepare Comp Ex HH in like manner to Comp Ex X but include 7.45 g silica coating aluminum nitride (SCAN71 from The Dow Chemical Company). Prepare Ex 57 in like manner as Comp Ex HH except include 0.116 g choline salicylate. Aryl Scission characterization reveals 710 ppm benzene for Comp Ex HH and 5 ppm benzene for Ex 57.

Comp Ex II and Ex 58. Prepare Comp Ex II in like manner to Comp Ex X but include 4.47 g carbon black (Darco G-60). Prepare Ex 58 in like manner as Comp Ex II except include 0.181 g choline salicylate. Aryl Scission characterization reveals 1797 ppm benzene for Comp Ex II and 23 ppm benzene for Ex 58.

Comp Exs JJ-LL and Exs 59-67: Effect of Different Particulates

The following examples and comparative examples illustrate the aryl-scission reduction effect of in-scope quaternary ammonium components on aryl-functionalized polysiloxanes with carbon-carbon unsaturation when other fillers do not have such an effect.

Comp Ex X establishes a reference formulation with 519 ppm benzene produce during Aryl Scission characterization.

Comp Ex JJ. Prepare Comp Ex JJ in like manner as Comp Ex X, except include 0.343 g tetrapropylammonium bisulfate. Aryl Scission characterization reveals 15,306 ppm benzene for Comp Ex JJ, a dramatic increase due to the tetrapropylammonium bisulfate.

Comp Ex KK. Prepare Comp Ex KK in like manner as Comp Ex X, except include 0.418 g tetramethylammonium hydroxide pentahydrate. Aryl Scission characterization reveals 2983 ppm benzene for Comp Ex KK, a dramatic increase due to the tetramethylammonium hydroxide pentahydrate.

Ex 59. Prepare Ex 59 in like manner as Comp Ex X, except include 0.421 g decamethonium bromine. Aryl Scission characterization reveals 1230 ppm benzene for Ex 59, an increase in phenyl scission relative to Comp Ex X. This example illustrates that decamethonium bromide is highly effective at reducing phenyl scission in systems with silanol functionality in the aryl-functionalized siloxane (see, for example, Ex 16) but increases phenyl scission in this hydrosilation system where the aryl-functionalized siloxane does not have silanol functionality. This result suggests that this quaternary ammonium compound is more effective with silanol-functionalized siloxanes at reducing phenyl scission.

Ex 60. Prepare Ex 60 in like manner as Comp Ex X, except include 0.447 g choline dihydrogencitrate salt. Aryl Scission characterization reveals 439 ppm benzene for Ex 60, which corresponds to a slight reduction in phenyl scission due to the choline dihydrogencitrate salt. Notably, choline dihydrogencitrate salt proved highly effective at minimizing phenyl scission in silanol-functionalized aryl-functionalized siloxanes (see Ex 1), suggesting this quaternary ammonium compound is more effective at reducing aryl scission when the siloxane is silanol-functionalized.

Ex 61. Prepare Ex 61 in like manner as Comp Ex X, except include 0.242 g N-trimethoxysilylpropyl-N,N,N-trimethylammonium chloride (also known as 3-trimethoxysilylpropyl-N,N,N-trimethylammonium chloride). Aryl Scission characterization reveals 325 pp m benzene for Ex 61, which corresponds to a reduction in aryl scission due to the N-trimethoxysilylpropyl-N,N,N-trimethylammonium chloride. Notably, N-trimethoxysilylpropyl-N,N,N-trimethylammonium chloride reduced aryl scission by three orders of magnitude in silanol-functionalized aryl-functionalized siloxanes (see Ex 17), suggesting this quaternary ammonium compound is more effective at reducing aryl scission when the siloxane is silanol-functionalized.

Ex 62. Prepare Ex 62 in like manner as Comp Ex X, except include 0.494 g tetrabutylammonium bromide. Aryl Scission characterization reveals 80 ppm benzene for Ex 62, decrease due to the tetrabutylammonium bromide.

Ex 63. Prepare Ex 63 in like manner as Comp Ex X, except include 0.304 g choline octoate. Aryl Scission characterization reveals 20 ppm benzene for Ex 63, decrease due to the choline octoate.

Ex 64. Prepare Ex 64 in like manner as Comp Ex X, except include 1.165 g quaternary ammonium functional silicone 1 from Ex 9. Aryl Scission characterization reveals 80 ppm benzene for Ex 64, decrease due to the quaternary ammonium functional silicone 1.

Comp Ex LL. Prepare Comp Ex LL in like manner as Comp Ex X, except use 0.0002 g catalyst instead of 0.00002 g (increase catalyst concentration by an order of magnitude). Aryl Scission characterization reveals 7.122 ppm benzene for Comp Ex LL, indicating increasing catalyst also dramatically increases phenyl scission.

Ex 64. Prepare Ex 64 in like manner as Comp Ex LL, except include 0.907 g poly(diallyldimethylammonium chloride). Aryl Scission characterization reveals 4375 ppm benzene for Ex 64, which corresponds to a reduction in phenyl scission of nearly 50%. Notably, poly(diallyldimethylammonium chloride) reduced phenyl scission by two orders of magnitude in the compositions containing silanol-functionalized aryl-functionalized siloxanes (see Ex 13), suggesting this quaternary ammonium compound is more effective at reducing aryl scission when the siloxane is silanol-functionalized.

Ex 65. Prepare Ex 65 in like manner as Comp Ex LL, except include 0.922 g N-trimethoxysilypropyl-N,N,N-trimethylammonium chloride. Aryl Scission characterization reveals 932 ppm benzene for Ex 65, a reduction in aryl scission of nearly an order of magnitude. Notably, N-trimethoxysilylpropyl-N,N,N-trimethylammonium chloride reduced aryl scission by three orders of magnitude in silanol-functionalized aryl-functionalized siloxanes (see Ex 17), suggesting this quaternary ammonium compound is more effective at reducing aryl scission when the siloxane is silanol-functionalized.

Ex 66. Prepare Ex 66 in like manner as Comp Ex LL, except include 0.137 g DPS choline octoate Aryl Scission characterization reveals 15 ppm benzene for Ex 66, decrease of over two orders of magnitude in aryl scission due to the choline octoate.

Ex 67. Prepare Ex 67 in like manner as Comp Ex LL, except include 1.067 g quaternary ammonium functional silicone 1 from Ex 9. Aryl Scission characterization reveals 6 ppm benzene for Ex 67, corresponding to over three orders of magnitude decrease in aryl scission due to the quaternary ammonium functional silicone 1.

What is claimed is:

1. A composition comprising an aryl-functionalized polysiloxane and quaternary ammonium compound, where the polysiloxane comprises silanol functionality and T siloxane units and where the quaternary ammonium compound has and anion selected from a group consisting of: salicylate, dihydrogen citrate, maleate, hydrogenglutaric acid anion, and bistartaric acid anion; and wherein the composition further comprises inorganic particulates.

2. The composition of claim 1, wherein the concentration of quaternary ammonium compound is 0.01 to 20 weight-percent relative to aryl-functionalized polysiloxane weight.

3. The composition of claim 1, wherein the quaternary ammonium compound cation is N,N,N-trimethyl ethanolammonium cation.

4. The composition of claim 1, wherein the composition further comprises any one or combination of more than one organometallic catalyst selected from a group consisting of organometallic compounds containing a metal selected from a group consisting of titanium, zirconium, tin, zinc, bismuth, cobalt, iron, vanadium and cadmium.

5. The composition of claim 1, wherein the aryl-functionalized polysiloxane is crosslinked.

6. The composition of claim 1, wherein the composition is in the form of one or more form selected from a group consisting of a coating, encapsulant, an elastomer, an adhesive and a gel.

7. A process comprising heating the composition of claim 1 to a temperature of 120 degrees Celsius or higher.

8. The process of claim 7, comprising applying the composition to a substrate and then heating to a temperature of 120 degrees Celsius or higher.

* * * * *